United States Patent
Suzuki

(10) Patent No.: US 9,780,387 B2
(45) Date of Patent: Oct. 3, 2017

(54) FUEL CELL

(71) Applicant: HONDA MOTOR CO., LTD., Minato-ku, Tokyo (JP)

(72) Inventor: Masaharu Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 14/289,785

(22) Filed: May 29, 2014

(65) Prior Publication Data
US 2014/0356759 A1 Dec. 4, 2014

(30) Foreign Application Priority Data

Jun. 4, 2013 (JP) .................. 2013-117563
May 15, 2014 (JP) .................. 2014-101061

(51) Int. Cl.
H01M 8/10 (2016.01)
H01M 8/0202 (2016.01)
H01M 8/241 (2016.01)
H01M 8/026 (2016.01)
H01M 8/0265 (2016.01)
H01M 8/2483 (2016.01)
(Continued)

(52) U.S. Cl.
CPC ......... *H01M 8/0202* (2013.01); *H01M 8/026* (2013.01); *H01M 8/0258* (2013.01); *H01M 8/0265* (2013.01); *H01M 8/04089* (2013.01); *H01M 8/04201* (2013.01); *H01M 8/241* (2013.01); *H01M 8/2457* (2016.02); *H01M 8/2483* (2016.02); *H01M 8/0267* (2013.01); *H01M 2008/1095* (2013.01)

(58) Field of Classification Search
CPC ............ H01M 8/0202; H01M 8/0258; H01M 8/0267; H01M 8/04089; H01M 8/04201; H01M 8/2457; H01M 8/241; H01M 8/026; H01M 8/0265; H01M 8/2483; H01M 2008/1095
USPC ........................................ 429/482
See application file for complete search history.

(56) References Cited

U.S. PATENT DOCUMENTS 7,611,788 B2 * 11/2009 Kikuchi .............. H01M 8/0258
                                                                                         429/434
2005/0112422 A1 * 5/2005 Yoshimoto .......... H01M 8/0247
                                                                                        429/434

FOREIGN PATENT DOCUMENTS

JP 2001110436 A 4/2001
JP 2006-210212 * 8/2006 ............. H01M 8/02
(Continued)

OTHER PUBLICATIONS

Office Action dated Dec. 20, 2016 issued over the corresponding Japanese Patent Application No. 2014-101061 with English translation.

Primary Examiner — Osei Amponsah
(74) Attorney, Agent, or Firm — Carrier Blackman & Associates, P.C.; William D. Blackman; Jingli Wang

(57) ABSTRACT

A unit cell of a fuel cell includes a membrane electrode assembly and a cathode side separator and an anode side separator sandwiching the membrane electrode assembly. An oxygen-containing gas supply passage connected to an oxygen-containing gas flow field is formed in the cathode side separator. The oxygen-containing gas supply passage has a rectangular shape extending in a flow field width direction of the oxygen-containing gas flow field. The width of the opening of the oxygen-containing gas supply passage on the short side is increased from the end side to the central side in the flow field width direction.

5 Claims, 9 Drawing Sheets

(51) Int. Cl.
*H01M 8/2457* (2016.01)
*H01M 8/0258* (2016.01)
*H01M 8/04089* (2016.01)
*H01M 8/04082* (2016.01)
*H01M 8/0267* (2016.01)
*H01M 8/1018* (2016.01)

(56) References Cited

FOREIGN PATENT DOCUMENTS

JP 2006202524 A 8/2006
JP 2008-293743 A 12/2008

\* cited by examiner

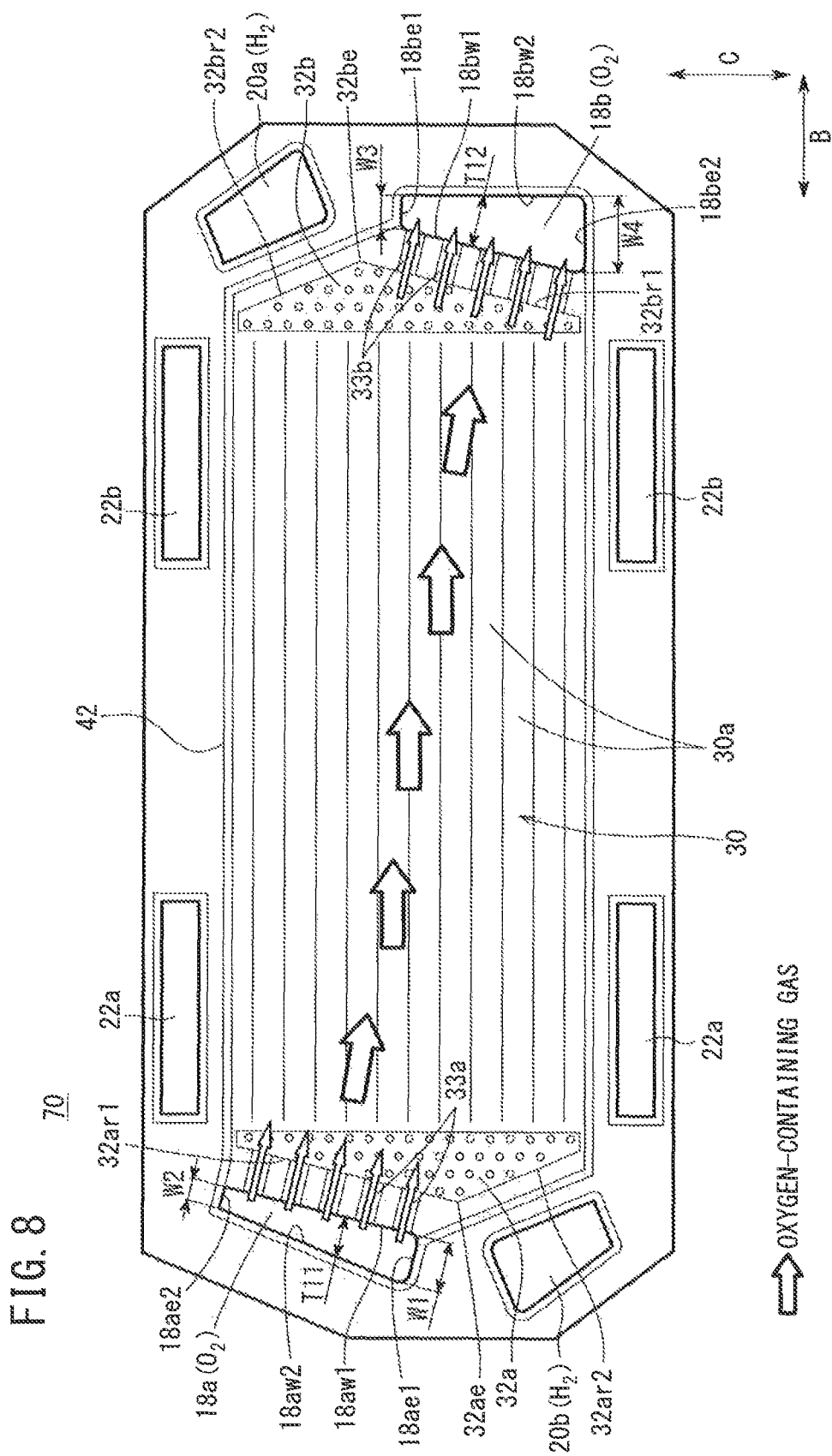

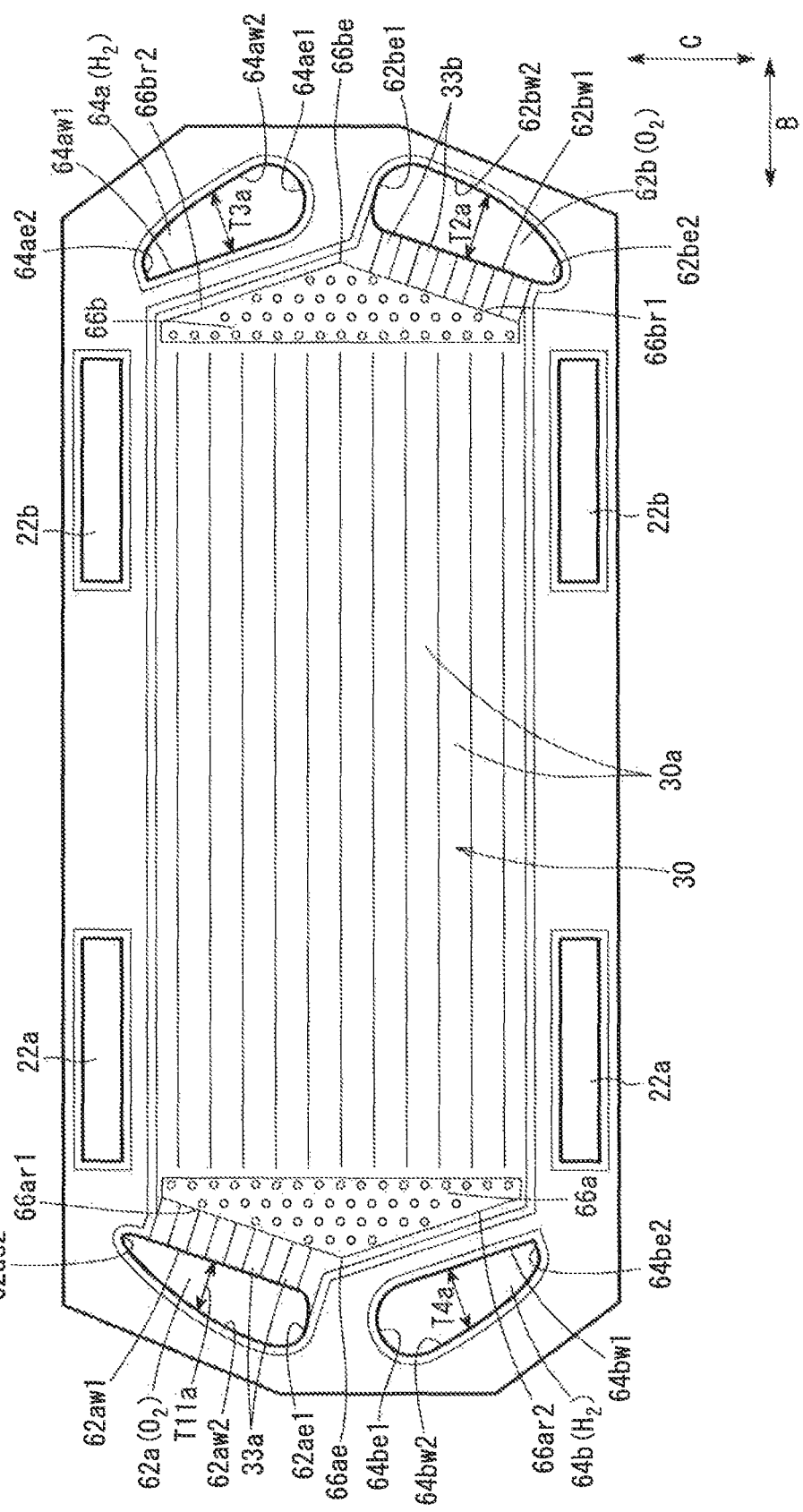

FUEL CELL

CROSS-REFERENCE TO RELATED APPLICATIONS

This application is based upon and claims the benefit of priority from Japanese Patent Applications No. 2013-117563 filed on Jun. 4, 2013 and No. 2014-101061 filed on May 15, 2014, the contents all of which are incorporated herein by reference.

BACKGROUND OF THE INVENTION

Field of the Invention

The present invention relates to a fuel cell formed by stacking a membrane electrode assembly and separators. The membrane electrode assembly includes a pair of electrodes and an electrolyte membrane interposed between the electrodes.

Description of the Related Art

For example, a solid polymer electrolyte fuel cell employs an electrolyte membrane. The electrolyte membrane is a polymer ion exchange membrane. In the fuel cell, the electrolyte membrane is interposed between an anode and a cathode to form a membrane electrode assembly (MEA). The membrane electrode assembly is sandwiched between a pair of separators to form a unit cell (power generation cell). In use, in the fuel cell, generally, a predetermined number of unit cells are stacked together to form a fuel cell stack, e.g., mounted in a vehicle.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the adjacent separators of the fuel cells for supplying a coolant within electrode areas along surfaces of the separators.

Further, mostly, the fuel cell adopts so called internal manifold structure in which a fuel gas supply passage and a fuel gas discharge passage, an oxygen-containing gas supply passage and an oxygen-containing gas discharge passage, and a coolant supply passage and a coolant discharge passage are formed in the fuel cell for allowing the fuel gas, the oxygen-containing gas, and the coolant to flow through the unit cells in the stacking direction.

However, in the internal manifold type fuel cell, it is difficult to uniformly supply reactant gases over the entire surfaces of reactant gas flow fields from reactant gas passages. In this regard, for example, a fuel cell disclosed in Japanese Laid-Open Patent Publication No. 2008-293743 is known.

The fuel cell is formed by stacking a membrane electrode assembly and separators. In the fuel cell, an electrolyte membrane is interposed between electrodes. The fuel cell has a reactant gas flow field for supplying reactant gases to electrode surfaces and reactant gas passages for allowing the reactant gases to flow in the stacking direction.

Each of the separators includes a substantially triangular inlet buffer having the width equal to the width of the reactant gas flow field and disposed on an inlet side of the reactant gas flow field. A portion of the reactant gas passage for supping the reactant gas is positioned adjacent to one ridge line of the inlet buffer. Further, the inlet buffer includes a plurality of protrusions. The density providing the protrusions is determined such that the protrusions are sparsely provided on the central side of the inlet buffer in comparison with the end side of the inlet buffer.

According to the disclosure, on the central side of the inlet buffer in the width direction where the reactant gas can flow smoothly, since the protrusions are sparsely provided, the flow rate of the reactant gas is low, and the reactant gas can be guided to the flow groves on the central side of the reactant gas flow field in the width direction.

SUMMARY OF THE INVENTION

The present invention relate to a technique of this type, and an object of the present invention is to provide a fuel cell having simple and economical structure in which it is possible to uniformly supply reactant gases over the entire surface of a reactant gas flow field, and achieve desired power generation performance.

A fuel cell according to the present invention is formed by stacking a membrane electrode assembly and separators. The membrane electrode assembly includes electrodes and an electrolyte membrane interposed between the electrodes. One of the separators has a reactant gas flow field for allowing a fuel gas or an oxygen-containing gas as one of reactant gases to flow along a separator surface in one direction and a reactant gas passage connected to the reactant gas flow field for allowing the one of the reactant gases to flow in the stacking direction of the separators.

In the fuel cell, the reactant gas passage has a rectangular shape extending in a flow field width direction intersecting with a flow direction in the reactant gas flow field. In the reactant gas passage, a width of an opening on a short side is increased from an end side to a central side in the flow field width direction.

In the present invention, the width of the opening of the reactant gas passage on the short side is increased from the end side to the central side in the flow field width direction of the reactant gas flow field. In the structure, the pressure loss on the end side in the flow field width direction is higher than the pressure loss on the central side in the flow field width direction. Therefore, it is possible to increase the flow rate of the reactant gas supplied to the central side in the flow field width direction where, in particular, the reactant gas tends to flow insufficiently. Accordingly, it becomes possible to uniformly supply the reactant gas over the entire surface of the reactant gas flow field.

Accordingly, with the simple and economical structure, it is possible to uniformly and reliably supply the reaction gas over the entire surface of the reaction gas flow field. Thus, the desired power generation performance is achieved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a front view showing a cathode side separator of a fuel cell according to a third embodiment of the present invention; and FIG. 9 is a front view showing a cathode side separator of a fuel cell according to a fourth embodiment of the present invention.

DESCRIPTION OF THE PREFERRED EMBODIMENTS

Figure 1:
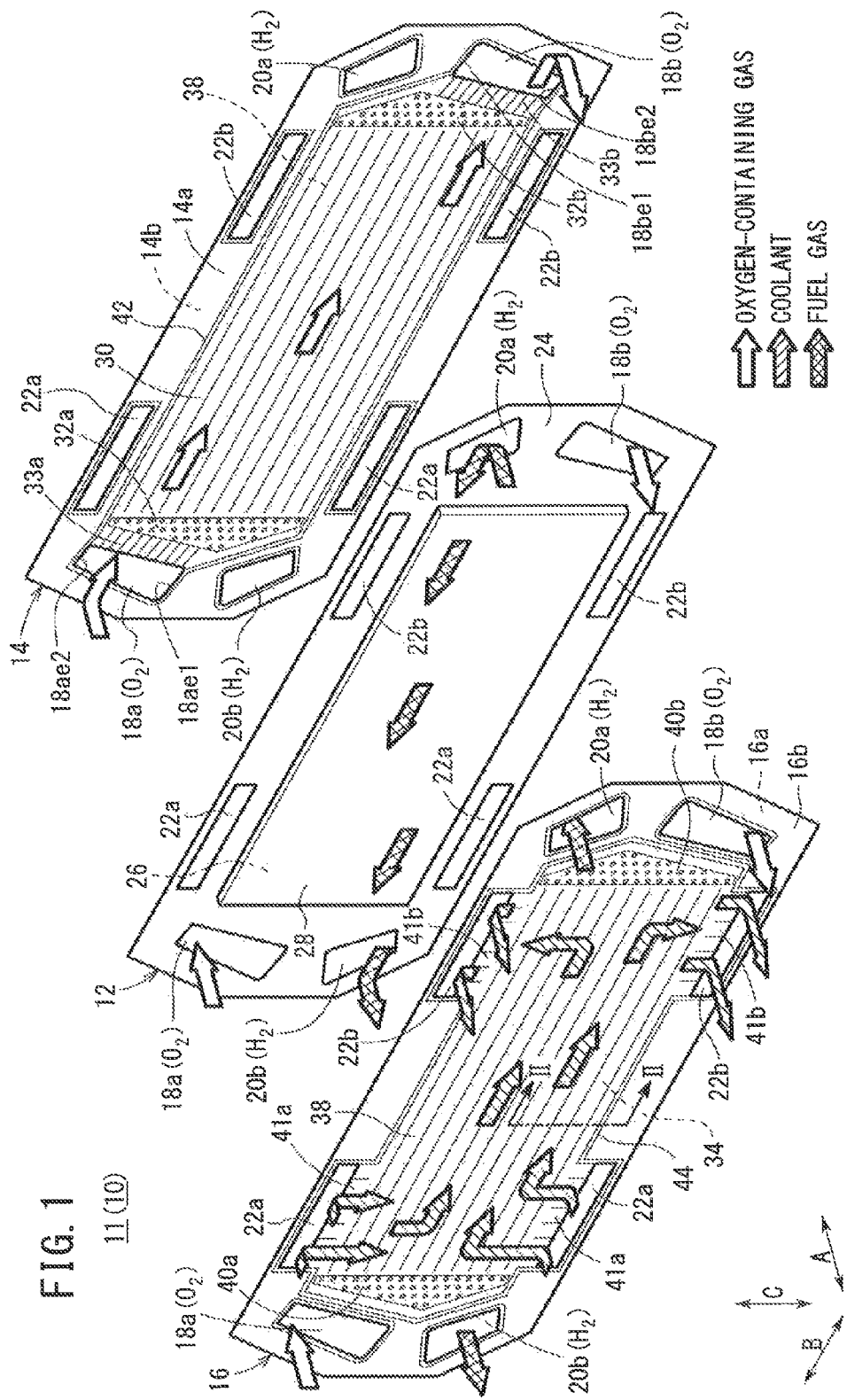
FIG. 1 is an exploded perspective view showing main components of a unit cell of a fuel cell according to a first embodiment of the present invention.
Figure 2:
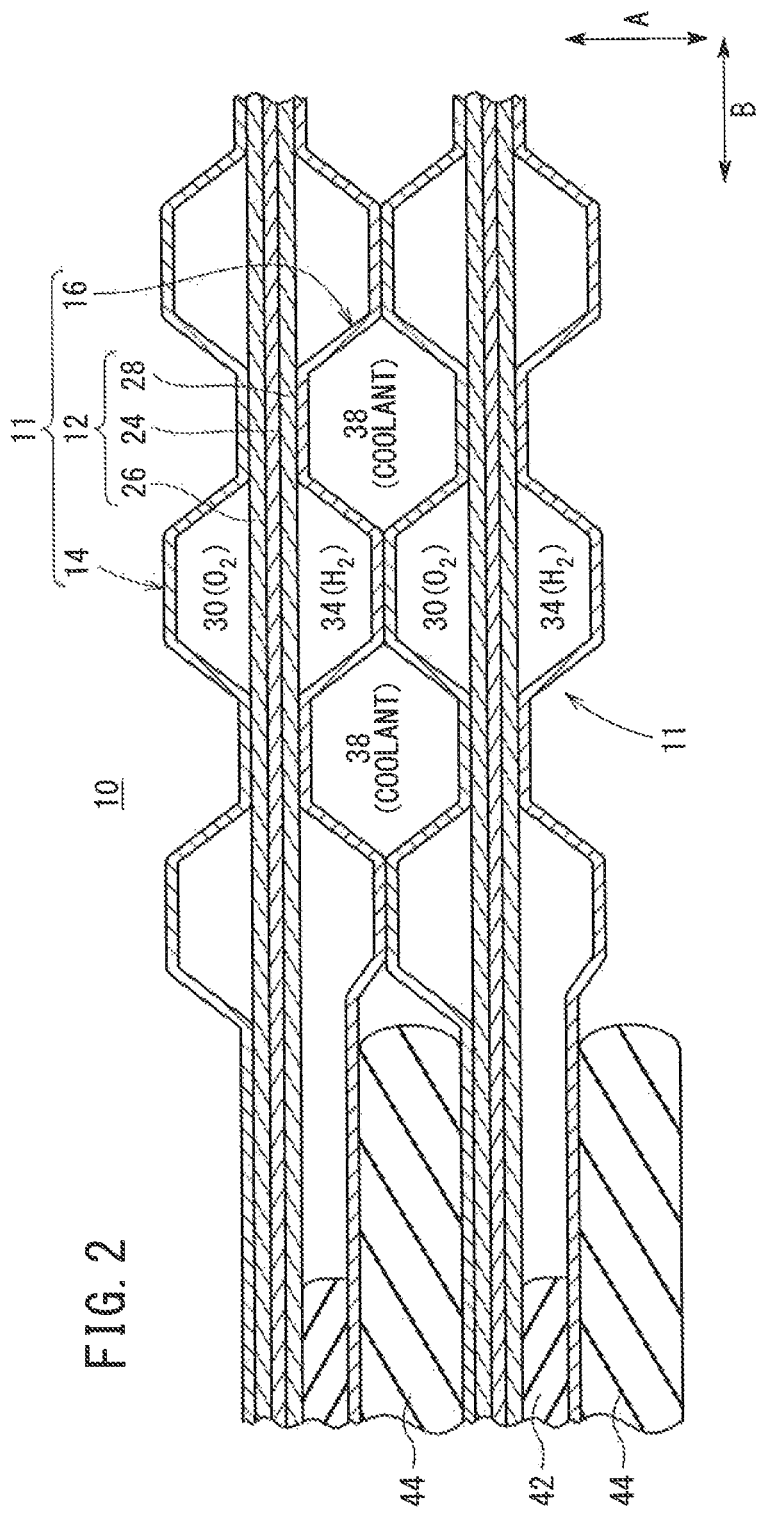
FIG. 2 is a cross sectional view showing the unit cell, taken along a line II-II in FIG. 1.

As shown in FIGS. 1 to 2, a fuel cell 10 according to a first embodiment of the present invention is formed by stacking a plurality of unit cells 11 upright (such that electrode surfaces are oriented in parallel to a vertical direction) in a direction indicated by an arrow A. Each of the unit cells 11 includes a membrane electrode assembly 12 and a cathode side separator 14 and an anode side separator 16 sandwiching the membrane electrode assembly 12.

For example, the cathode side separator 14 and the anode side separator 16 are thin metal separators such as steel plates, stainless steel plates, aluminum plates, plated steel sheets, or metal plates having anti-corrosive surfaces by surface treatment. For example, the metal separators have rectangular planar surfaces, and are formed by corrugating metal thin plates by press forming to have a corrugated shape in cross section and a wavy shape on the surface. Instead of the metal separators, for example carbon separators may be used as the cathode side separator 14 and the anode side separator 16.

Each of the cathode side separator 14 and the anode side separator 16 has a laterally elongated shape. Short sides of the cathode side separator 14 and the anode side separator 16 are oriented in a direction of gravity indicated by an arrow C, and long sides of the cathode side separator 14 and the anode side separator 16 are oriented in a horizontal direction indicated by an arrow B (the cathode side separator 14 and the anode side separator 16 are stacked in a horizontal direction). Alternatively, the short sides of the cathode side separator 14 and the anode side separator 16 may be oriented in the horizontal direction and long sides of the cathode side separator 14 and the anode side separator 16 may be oriented in the direction of gravity.

At one end of the unit cell 11 in a longitudinal direction indicated by the arrow B, an oxygen-containing gas supply passage (reactant gas passage) 18a and a fuel gas discharge passage (reactant gas passage) 20b are provided. The oxygen-containing gas supply passage 18a and the fuel gas discharge passage 20b extend through the unit cell 11 in the direction indicated by the arrow A. The oxygen-containing gas supply passage 18a supplies an oxygen-containing gas, and the fuel gas discharge passage 20b supplies a fuel gas such as a hydrogen-containing gas.

The oxygen-containing gas supply passage 18a and the fuel gas discharge passage 20b have a substantially rectangular shape. The cross sectional area of the opening of the oxygen-containing gas supply passage 18a is larger than the cross sectional area of the opening of the fuel gas discharge passage 20b.

At the other end of the unit cell 11 in the longitudinal direction, a fuel gas supply passage (reactant gas passage) 20a for supplying the fuel gas and an oxygen-containing gas discharge passage (reactant gas passage) 18b for discharging the oxygen-containing gas are provided. Each of the oxygen-containing gas discharge passage 18b and the fuel gas supply passage 20a has a substantially rectangular shape. The cross sectional area of the opening of the oxygen-containing gas discharge passage 18b is larger than the cross sectional area of the opening of the fuel gas supply passage 20a.

For example, four corners of the unit cell 11 are cut away in correspondence with the shapes of the oxygen-containing gas supply passage 18a, the fuel gas discharge passage 20b, the fuel gas supply passage 20a, and the oxygen-containing gas discharge passage 18b. The cutaways are not essential, and may be provided as necessary.

At both ends of the unit cell 11 in a lateral direction indicated by an arrow C, two coolant supply passages 22a for supplying a coolant are provided on one side. At both ends of the unit cell 11 in the lateral direction indicated by the arrow C, two coolant discharge passages 22b for discharging the coolant are provided on the other side. The coolant supply passages 22a and the coolant discharge passages 22b extend through the unit cell 11 in the direction indicated by the arrow A.

Each of the pair of coolant supply passages 22a has a substantially rectangular opening elongated in the flow direction in a coolant flow field 38 indicated by the arrow B. Each of the pair of coolant discharge passages 22b has a substantially rectangular opening elongated in the flow direction in the coolant flow field 38 indicated by the arrow B.

The membrane electrode assembly 12 includes a cathode 26, and anode 28, and a solid polymer electrolyte membrane 24 interposed between the cathode 26 and the anode 28. For example, the solid polymer electrolyte membrane 24 is made of fluorine based material or hydrocarbon based material.

Each of the cathode 26 and the anode 28 has a gas diffusion layer (not shown) such as a carbon paper, and an electrode catalyst layer (not shown) of porous carbon particles supporting platinum alloy thereon. The carbon particles are deposited uniformly on the surface of the gas diffusion layer. The electrode catalyst layer of the cathode 26 and the electrode catalyst layer of the anode 28 are fixed to both surfaces of the solid polymer electrolyte membrane 24, respectively.

Figure 3:
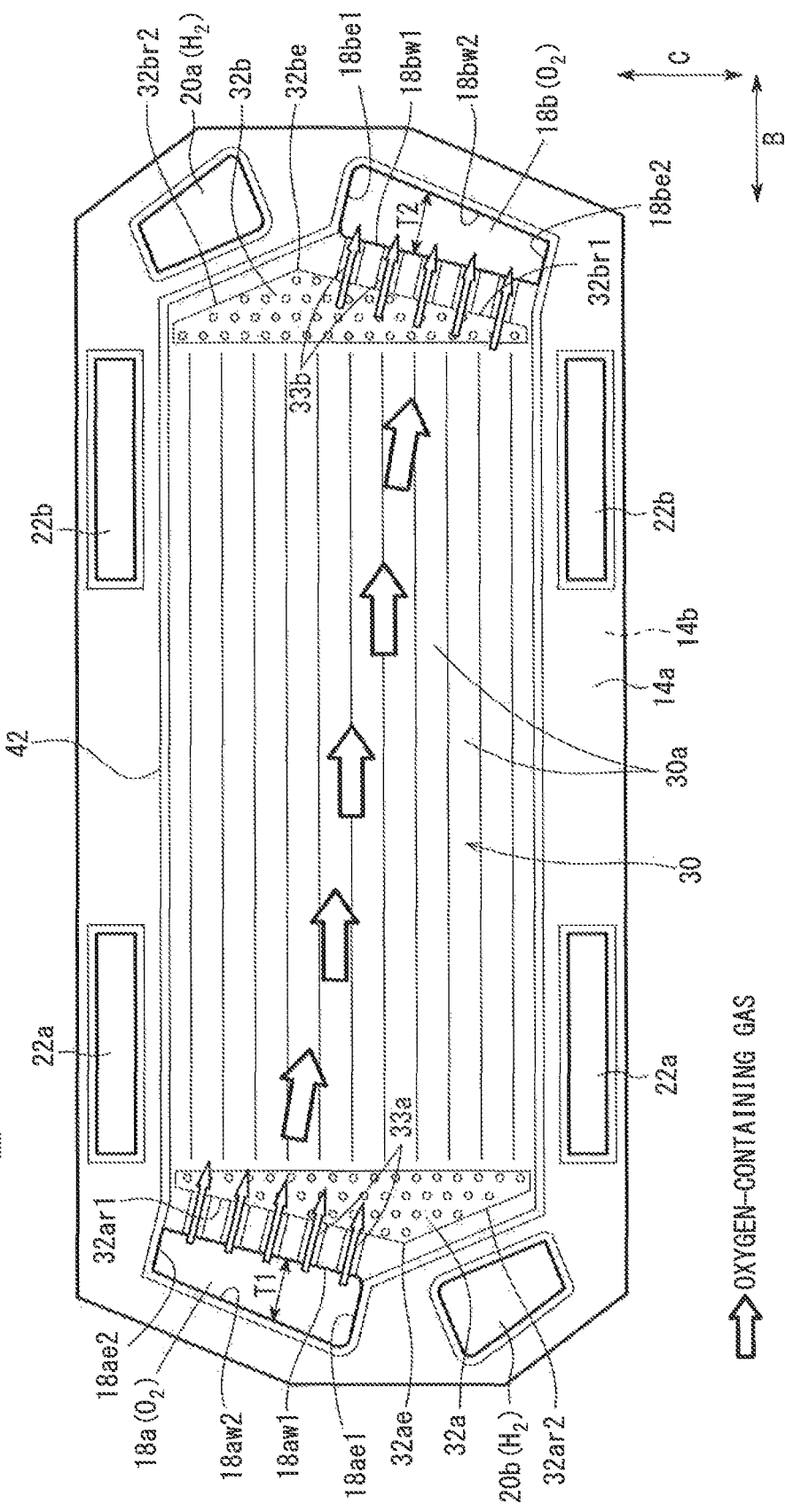
FIG. 3 is a front view showing a cathode side separator of the unit cell.

As shown in FIG. 3, the cathode side separator 14 has an oxygen-containing gas flow field (reactant gas flow field) 30 on its surface 14a facing the membrane electrode assembly 12. The oxygen-containing gas flow field 30 is connected to the oxygen-containing gas supply passage 18a and the oxygen-containing gas discharge passage 18b. The oxygen-containing gas flow field 30 includes a plurality of straight or wavy flow grooves 30a extending in the horizontal direction indicated by the arrow B for allowing the oxygen-containing gas to flow along separator surfaces in one of the longitudinal directions.

An inlet buffer 32a and an outlet buffer 32b are provided adjacent to the inlet and the outlet of the oxygen-containing gas flow field 30, respectively. The inlet buffer 32a has bosses protruding toward the membrane electrode assembly 12, and the outlet buffer 32b has bosses protruding toward the membrane electrode assembly 12. The inlet buffer 32a has a substantially triangular shape corresponding to the shapes of oxygen-containing gas supply passage 18a and the fuel gas discharge passage 20b. The inlet buffer 32a has a vertex 32ae spaced downward from the center in the height direction indicated by the arrow C.

The inlet buffer 32a has a first ridge line 32ar1 facing the oxygen-containing gas supply passage 18a and a second ridge line 32ar2 facing the fuel gas discharge passage 20b. The first ridge line 32ar1 is longer than the second ridge line 32ar2. The first ridge line 32ar1 is in parallel to an inner wall surface 18aw1 adjacent to the inlet buffer 32a of the oxygen-containing gas supply passage 18a.

The outlet buffer 32b has a substantially triangular shape corresponding to the shapes of oxygen-containing gas discharge passage 18b and the fuel gas supply passage 20a. The outlet buffer 32b has a vertex 32be spaced upward from the center in the height direction indicated by the arrow C. The outlet buffer 32b has a first ridge line 32br1 facing the oxygen-containing gas discharge passage 18b and a second ridge line 32br2 facing the fuel gas supply passage 20a. The first ridge line 32br1 is longer than the second ridge line 32br2. The first ridge line 32br1 is in parallel to an inner wall surface 18bw1 adjacent to the outlet buffer 32b of the oxygen-containing gas discharge passage 18b.

The inlet buffer 32a and the oxygen-containing gas supply passage 18a are connected by a plurality of inlet connection grooves 33a. The outlet buffer 32b and the oxygen-containing gas discharge passage 18b are connected by a plurality of outlet connection grooves 33b. The pitch of the inlet connection grooves 33a and the pitch of the outlet connection grooves 33b are the same. Further, the cross sectional area (of the cross section in the direction intersecting with the gas flowing direction) of the inlet connection grooves 33a and the cross sectional area of the outlet connection grooves 33b are the same.

The oxygen-containing gas supply passage 18a has a substantially rectangular shape extending in a flow field width direction indicated by the arrow C intersecting with the flow direction in the oxygen-containing gas flow field 30 indicated by the arrow B. In the oxygen-containing gas supply passage 18a, the width T1 of the opening on the short side is increased from the end side to the central side in the flow field width direction.

Specifically, the oxygen-containing gas supply passage 18a is surrounded by the long inner wall surface 18aw1 and a long outer wall surface 18aw2, and short end wall surfaces 18ae1, 18ae2. The end wall surface 18ae1 is longer than the end wall surface 18ae2. The spacing distance between the outer wall surface 18aw2 and the inner wall surface 18aw1 is increased from the end wall surface 18ae2 toward the end wall surface 18ae1. The outer wall surface 18aw2 is inclined relative to the inner wall surface 18aw1. Therefore, in the oxygen-containing gas supply passage 18a, the width T1 of the opening on the short side is increased continuously from the end side to the central side in the flow field width direction.

The oxygen-containing gas discharge passage 18b has a substantially rectangular shape extending in the flow field width direction indicated by the arrow C intersecting with the flow direction in the oxygen-containing gas flow field 30 indicated by the arrow B. In the oxygen-containing gas discharge passage 18b, the width T2 of the opening on the short side is increased from the end side to the central side in the flow field width direction.

Specifically, the oxygen-containing gas discharge passage 18b is surrounded by the long inner wall surface 18bw1 and a long outer wall surface 18bw2, and short end wall surfaces 18be1, 18be2. The end wall surface 18be1 is longer than the end wall surface 18be2. The spacing distance between the outer wall surface 18bw2 and the inner wall surface 18bw1 is increased from the end wall surface 18be2 toward the end wall surface 18be1. The outer wall surface 18bw2 is inclined relative to the inner wall surface 18bw1. Therefore, in the oxygen-containing gas discharge passage 18b, the width T2 of the opening on the short side is increased continuously from the end side to the central side in the flow field width direction.

Figure 4:
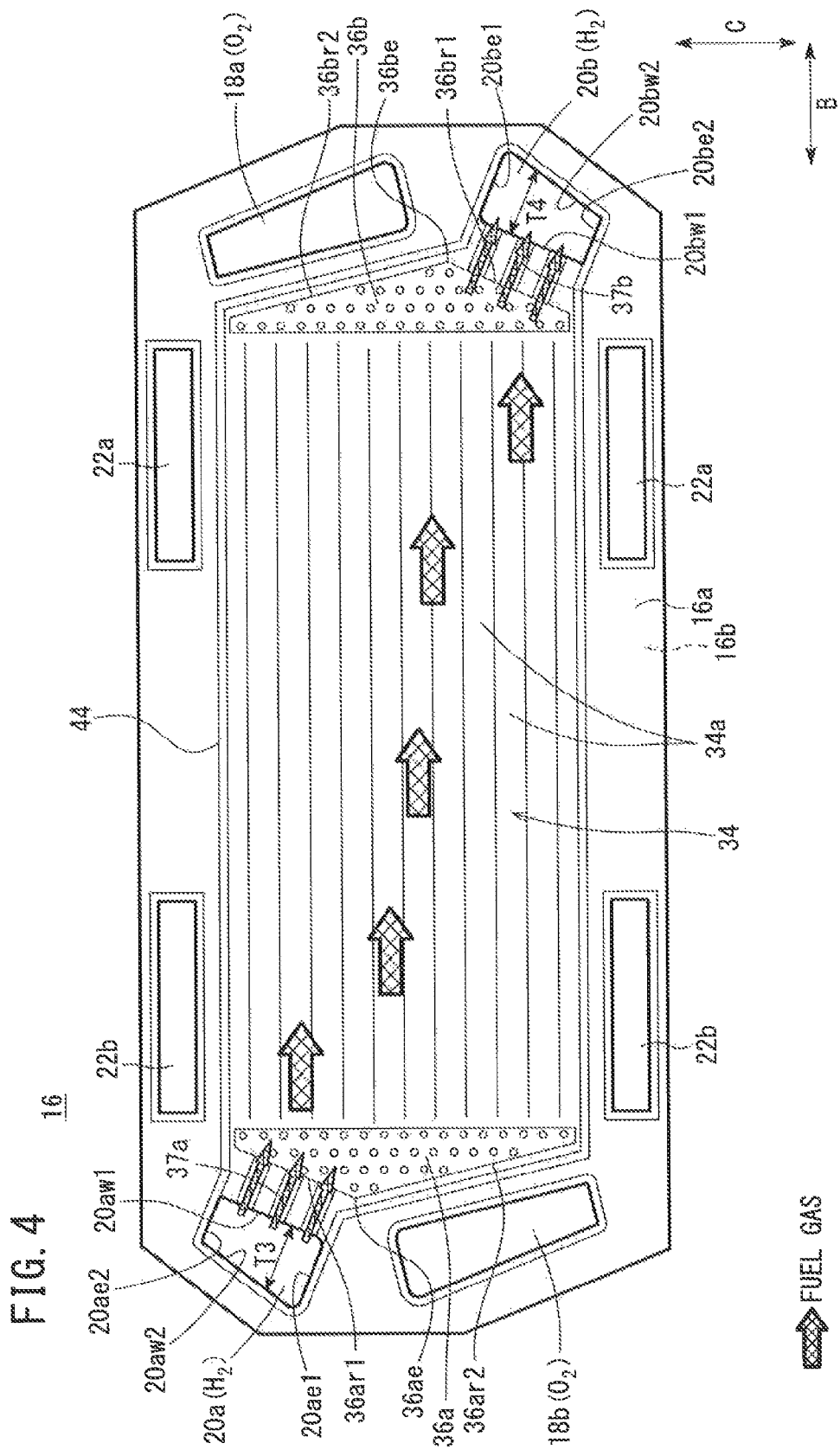
FIG. 4 is a front view showing an anode side separator of the unit cell.

As shown in FIG. 4, the anode side separator 16 has a fuel gas flow field 34 on its surface 16a facing the membrane electrode assembly 12. The fuel gas flow field 34 is connected to the fuel gas supply passage 20a and the fuel gas discharge passage 20b. The fuel gas flow field 34 includes a plurality of straight or wavy flow grooves 34a extending in the horizontal direction indicated by the arrow B for allowing the fuel gas to flow along separator surfaces in one of the longitudinal directions.

An inlet buffer 36a and an outlet buffer 36b are provided adjacent to the inlet and the outlet of the fuel gas flow field 34, respectively. The inlet buffer 36a has bosses protruding toward the membrane electrode assembly 12, and the outlet buffer 36b has bosses protruding toward the membrane electrode assembly 12. The inlet buffer 36a has a substantially triangular shape corresponding to the shapes of the fuel gas supply passage 20a and the oxygen-containing gas discharge passage 18b. The inlet buffer 36a has a vertex 36ae spaced upward from the center in the height direction indicated by the arrow C.

The inlet buffer 36a has a first ridge line 36ar1 facing the fuel gas supply passage 20a and a second ridge line 36ar2 facing the oxygen-containing gas discharge passage 18b. The first ridge line 36ar1 is shorter than the second ridge line 36ar2. The first ridge line 36ar1 is in parallel to an inner wall surface 20aw1 adjacent to the inlet buffer 36a of the fuel gas supply passage 20a.

The outlet buffer 36b has a substantially triangular shape corresponding to the shapes of the fuel gas discharge passage 20b and the oxygen-containing gas supply passage 18a. The triangular outlet buffer 36b has a vertex 36be spaced downward from the center in the height direction indicated by the arrow C. The outlet buffer 36b has a first ridge line 36br1 facing the fuel gas discharge passage 20b and a second ridge line 36br2 facing the oxygen-containing gas supply passage 18a. The first ridge line 36br1 is shorter than the second ridge line 36br2. The first ridge line 36br1 is in parallel to an inner wall surface 20bw1 of the fuel gas discharge passage 20b adjacent to the outlet buffer 36b.

The inlet buffer 36a and the fuel gas supply passage 20a are connected by a plurality of inlet connection grooves 37a. The outlet buffer 36b and the fuel gas discharge passage 20b are connected by a plurality of outlet connection grooves 37b. The pitch of the inlet connection grooves 37a and the pitch of the outlet connection grooves 37b are the same. Further, the cross sectional area (of the cross section in the direction intersecting with the gas flowing direction) of the inlet connection grooves 37a and the cross sectional area of the outlet connection grooves 37b are the same.

The fuel gas supply passage 20a has a substantially rectangular shape extending in the flow field width direction indicated by the arrow C intersecting with the flow direction in the fuel gas flow field 34 indicated by the arrow B. In the fuel gas supply passage 20a, the width T3 of the opening on the short side is increased from the end side to the central side in the flow field width direction.

Specifically, the fuel gas supply passage 20a is surrounded by the long inner wall surface 20aw1 and a long outer wall surface 20aw2, and short end wall surfaces 20ae1, 20ae2. The end wall surface 20ae1 is longer than the end wall surface 20ae2. The spacing distance between the outer wall surface 20aw2 and the inner wall surface 20aw1 is increased from the end wall surface 20ae2 toward the end wall surface 20ae1. The outer wall surface 20aw2 is inclined relative to the inner wall surface 20aw1. Therefore, in the fuel gas supply passage 20a, the width T3 of the opening on the short side is increased continuously from the end side to the central side in the flow field width direction.

The fuel gas discharge passage 20b has a substantially rectangular shape extending in the flow field width direction indicated by the arrow C intersecting with the flow direction in the fuel gas flow field 34 indicated by the arrow B. In the fuel gas discharge passage 20b, the width T4 of the opening on the short side is increased from the end side to the central side in the flow field width direction.

Specifically, the fuel gas discharge passage 20b is surrounded by the long inner wall surface 20bw1, a long outer wall surface 20bw2, and short end wall surfaces 20be1, 20be2. The end wall surface 20be1 is longer than the end wall surface 20be2. The spacing distance between the outer wall surface 20bw2 and the inner wall surface 20bw1 is increased from the end wall surface 20be2 toward the end wall surface 20be1. The outer wall surface 20bw2 is inclined relative to the inner wall surface 20bw1. Therefore, in the fuel gas discharge passage 20b, the width T4 of the opening on the short side is increased continuously from the end side to the central side in the flow field width direction.

As shown in FIG. 1, the coolant flow field 38 is formed between a surface 16b of the anode side separator 16 and a surface 14b of a cathode side separator 14. The coolant flow field 38 is connected to the coolant supply passages 22a, 22a and the coolant discharge passages 22b, 22b. The coolant flows through the coolant flow field 38 over the electrode area of the membrane electrode assembly 12. An inlet buffer 40a and an outlet buffer 40b are provided adjacent to the inlet and the outlet of the coolant flow field 38, respectively.

In the anode side separator 16, the coolant flow field 38 has a shape of the back surface of the fuel gas flow field 34, and the inlet buffer 40a and the outlet buffer 40b have shapes of the back surfaces of the outlet buffer 36b and the inlet buffer 36a, respectively. In the cathode side separator 14, the coolant flow field 38 has a shape of the back surface of the oxygen-containing gas flow field 30, and the inlet buffer 40a and the outlet buffer 40b have shapes of the back surfaces of the inlet buffer 32a and the outlet buffer 32b, respectively.

A plurality of inlet connection grooves 41a are provided adjacent to the coolant supply passage 22a, and a plurality of outlet connection grooves 41b are provided adjacent to the coolant discharge passage 22b. The oxygen-containing gas flows through the oxygen-containing gas flow field 30 and the fuel gas flows through the fuel gas flow field 34 in a counterflow manner, and the coolant flows through the coolant flow field 38 in parallel to the oxygen-containing gas.

A first seal member 42 is formed integrally with the surfaces 14a, 14b of the cathode side separator 14, around the outer end of the cathode side separator 14. A second seal member 44 is formed integrally with the surfaces 16a, 16b of the anode side separator 16, around the outer end of the anode side separator 16. Each of the first seal member 42 and the second seal member 44 is an elastic seal member made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Operation of the fuel cell 10 will be described below.

Firstly, as shown in FIG. 1, an oxygen-containing gas is supplied to the oxygen-containing gas supply passage 18a, and a fuel gas such as a hydrogen-containing gas is supplied to the fuel gas supply passage 20a. Further, a coolant such as pure water, ethylene glycol, or oil is supplied to the pair of coolant supply passages 22a.

Thus, as shown in FIGS. 1 and 3, the oxygen-containing gas from the oxygen-containing gas supply passage 18a flows through the inlet connection groove 33a and the inlet buffer 32a into the oxygen-containing gas flow field 30 of the cathode side separator 14. The oxygen-containing gas flows along the oxygen-containing gas flow field 30 in one of the horizontal directions indicated by the arrow B, and the oxygen-containing gas is supplied to the cathode 26 of the membrane electrode assembly 12.

In the meanwhile, as shown in FIG. 4, the fuel gas from the fuel gas supply passage 20a flows through the inlet connection groove 37a and the inlet buffer 36a into the fuel gas flow field 34 of the anode side separator 16. The fuel gas flows along the fuel gas flow field 34 in one of the horizontal directions indicated by the arrow B, and the fuel gas is supplied to the anode 28 of the membrane electrode assembly 12 (see FIG. 1).

Thus, in the first membrane electrode assembly 12, the oxygen-containing gas supplied to the cathode 26 and the fuel gas supplied to the anode 28 are partially consumed in electrochemical reactions at catalyst layers of the cathode 26 and the anode 28 for generating electricity.

Then, as shown in FIGS. 1 and 3, the oxygen-containing gas partially consumed at the cathode 26 of the membrane electrode assembly 12 flows through the outlet buffer 32b and the outlet connection grooves 33b, and the oxygen-containing gas is discharged along the oxygen-containing gas discharge passage 18b in the direction indicated by the arrow A. In the meanwhile, as shown in FIG. 4, the fuel gas partially consumed at the anode 28 of the membrane electrode assembly 12 flows through the outlet buffer 36b and the outlet connection grooves 37b, and the fuel gas is discharged along the fuel gas discharge passage 20b in the direction indicated by the arrow A.

Further, the coolant supplied to the pair of coolant supply passages 22a flows into the coolant flow field 38 between the cathode side separator 14 and the anode side separator 16. As shown in FIG. 1, after the coolant temporarily flows inward in the direction of gravity indicated by the arrow C, the coolant moves in the horizontal direction indicated by the arrow B to cool the membrane electrode assembly 12. After this coolant moves outward in the direction indicated by the arrow C, the coolant is discharged into the pair of coolant discharge passages 22b.

In the first embodiment, as shown in FIG. 3, in the oxygen-containing gas supply passage 18a, the width T1 of the opening on the short side is increased from the end side to the central side in the flow field width direction of the oxygen-containing gas flow field 30.

Figure 5:
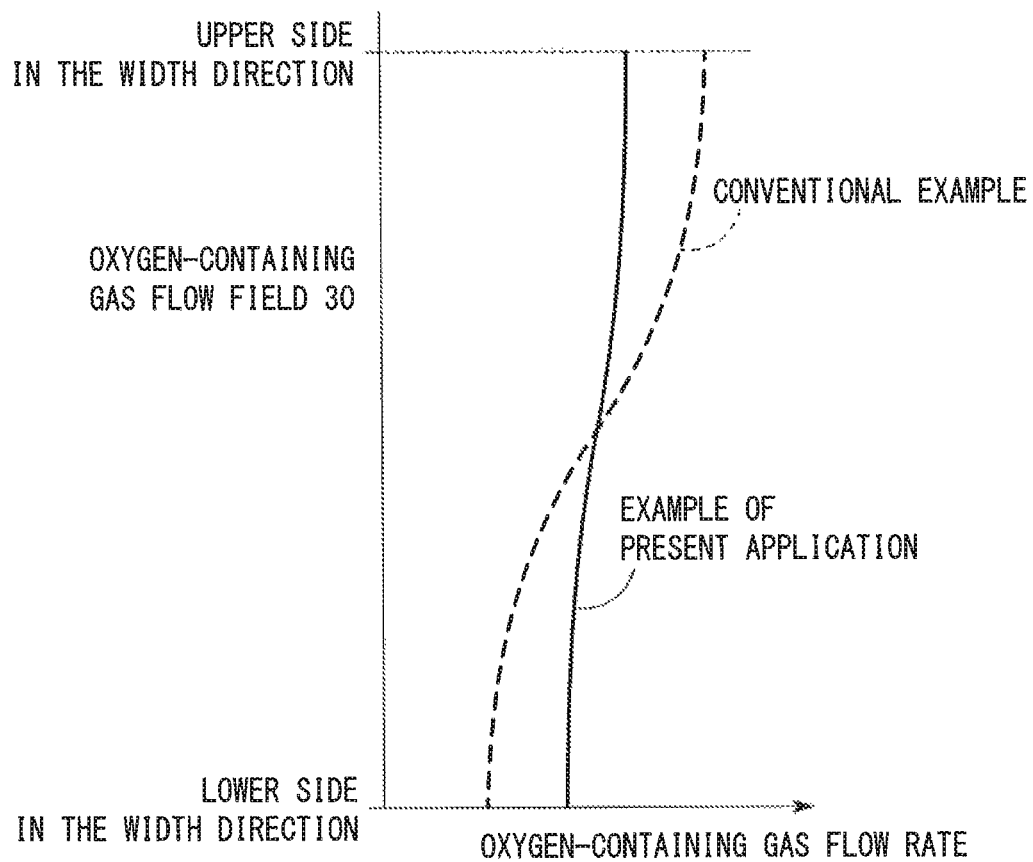
FIG. 5 is a graph illustrating comparison of the flow rate of an oxygen-containing gas supplied to an oxygen-containing gas flow field in an example of the present application and a conventional example.

In this regard, a conventional example where the width of the opening of the short side of the oxygen-containing gas supply passage 18a does not change in the long side direction was prepared. The distribution state of the oxygen-containing gas supplied to the oxygen-containing gas flow field 30 was compared between this conventional example and the structure of the present application (example of the present application). As a result, as shown in FIG. 5, in the conventional example, the flow rate of the oxygen-containing gas flowing from the oxygen-containing gas supply passage 18a toward the end (upper end) of the inlet buffer 32a is large. Therefore, the flow rate of the oxygen-containing gas flowing from the central side to the lower side of the inlet buffer 32a is small.

Therefore, a large quantity of the oxygen-containing gas is supplied toward the upper end of the oxygen-containing gas flow field 30 in the width direction. In the power generation area, the quantity of the oxygen-containing gas supplied on the lower side from the central position is small. Consequently, the oxygen-containing gas is supplied non-uniformly into the power generation area, and the durability and the power generation stability are low.

Figure 6:
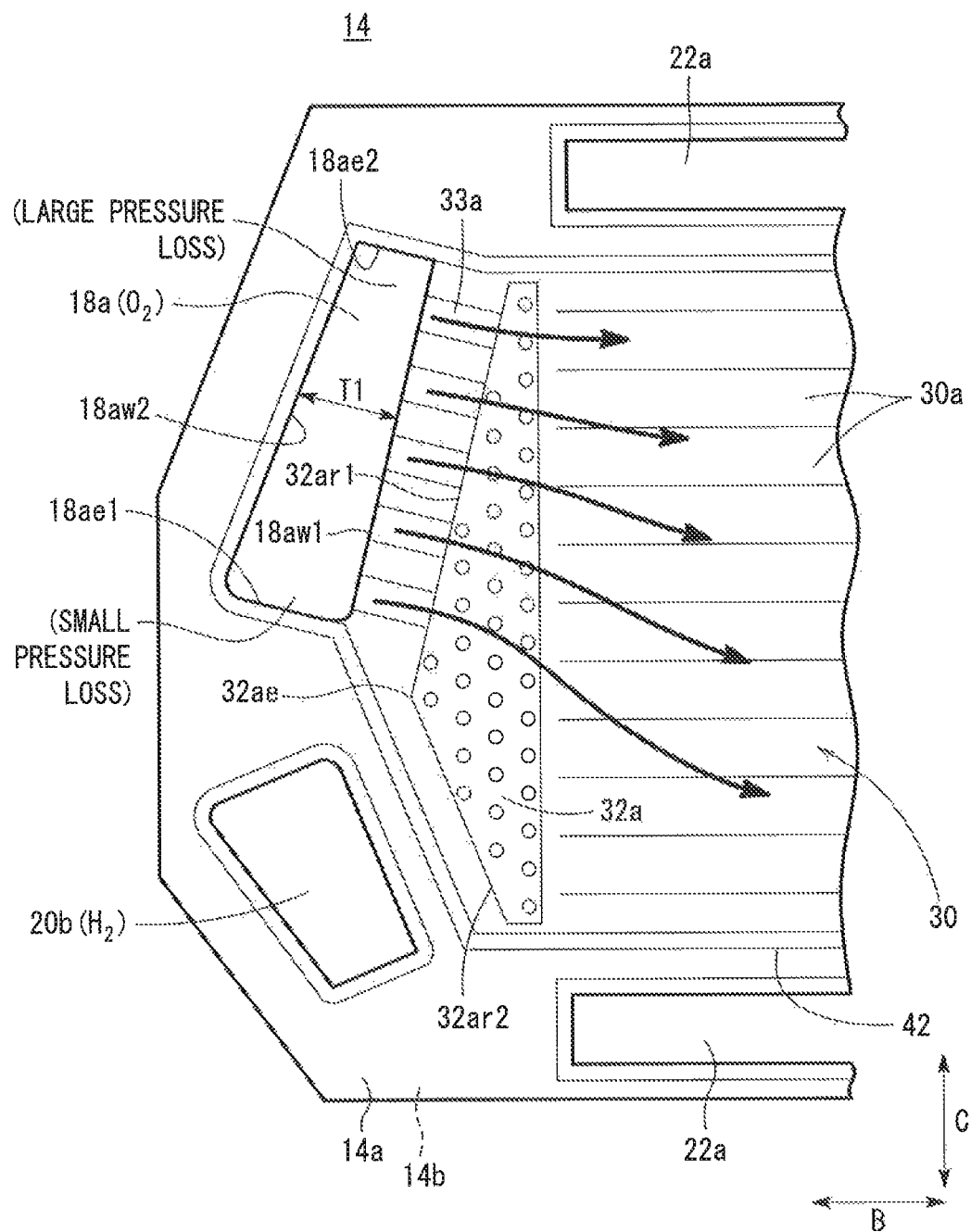
FIG. 6 is a view showing main components of an oxygen-containing gas supply passage of the unit cell.

In contrast, in the example of the present application, as shown in FIG. 6, in the oxygen-containing gas supply passage 18a, the pressure loss at the upper end side of the oxygen-containing gas flow field 30 in the width direction is high, and the pressure loss on the central side of the oxygen-containing gas flow field 30 in the width direction is low. Therefore, the flow rate of the oxygen-containing gas supplied from the oxygen-containing gas supply passage 18a to the central side of the inlet buffer 32a where the containing gas flows insufficiently is larger than the flow rate of the oxygen-containing gas supplied to the upper end side of the inlet buffer 32a.

Accordingly, with the simple and economical structure, it is possible to uniformly and reliably supply the oxygen-containing gas over the entire surface of the oxygen-containing gas flow field 30 in the width direction. Thus, the desired power generation performance is achieved.

The oxygen-containing gas discharge passage 18b has the same structure as the oxygen-containing gas supply passage 18a, and the same advantages are obtained. Further, as shown in FIG. 4, the fuel gas flow field 34 has the same structure as the oxygen-containing gas flow field 30, and the same advantages as in the case of the oxygen-containing gas flow field 30 are obtained.

Further, in the first embodiment, the unit cell 11 has the single membrane electrode assembly 12. Specifically, the unit cell 11 includes the single MEA and the two separators, i.e., the cathode side separator 14, and the anode side separator 16. However, the present invention is not limited in this respect. For example, the present invention is applicable to a fuel cell having skip cooling structure where unit cells each including two MEAs and three separators are provided (the MEAs are interposed between the separators), and a coolant flow field is formed between the adjacent unit cells.

Figure 7:
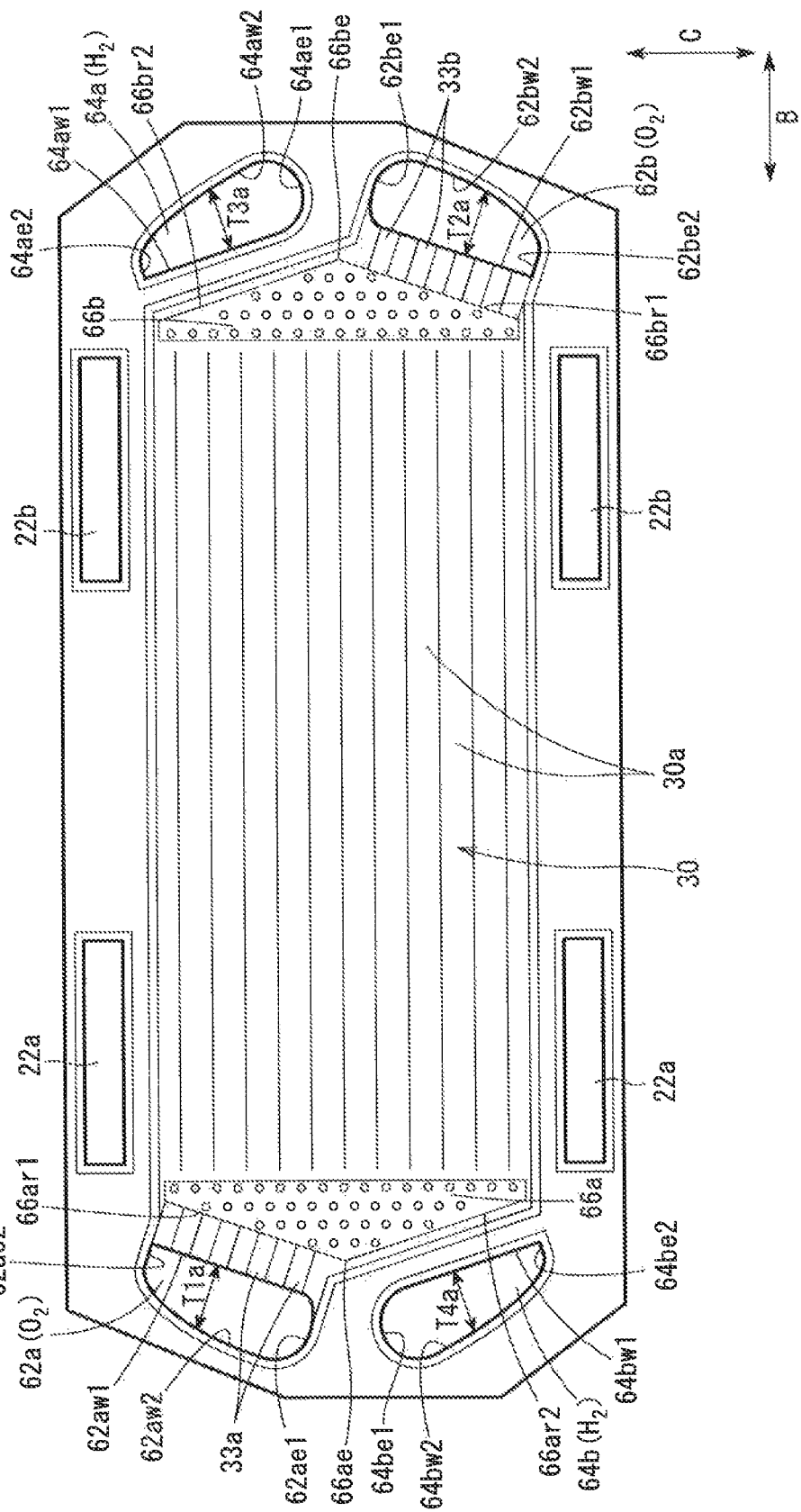
FIG. 7 is a front view showing a cathode side separator of a fuel cell according to a second embodiment of the present invention.

FIG. 7 is a front view showing a cathode side separator 60 of a fuel cell according to a second embodiment of the present invention. The constituent elements that are identical to those of the cathode side separator 14 of the fuel cell 10 according to the first embodiment are labeled with the same reference numerals and descriptions thereof will be omitted.

In the second embodiment, instead of the oxygen-containing gas supply passage 18a and the oxygen-containing gas discharge passage 18b, an oxygen-containing gas supply passage 62a and an oxygen-containing gas discharge passage 62b are provided. Further, instead of the fuel gas supply passage 20a and the fuel gas discharge passage 20b, a fuel gas supply passage 64a and a fuel gas discharge passage 64b are provided. The cross sectional area of the opening of the oxygen-containing gas supply passage 62a and the cross sectional area of the opening of the fuel gas discharge passage 64b are substantially the same, and the cross sectional area of the opening of the oxygen-containing gas discharge passage 62b and the cross sectional area of the opening of the fuel gas supply passage 64a are substantially the same.

The cathode side separator 60 has an inlet buffer 66a and an outlet buffer 66b adjacent to the inlet and the outlet of the oxygen-containing gas flow field 30. Each of the inlet buffer 66a and the outlet buffer 66b includes a plurality of bosses protruding toward the membrane electrode assembly. The inlet buffer 66a has a triangular shape corresponding to the shapes of the oxygen-containing gas supply passage 62a and the fuel gas discharge passage 64b. The length of a first ridge line 66ar1 facing the oxygen-containing gas supply passage 62a and the length of a second ridge line 66ar2 facing the fuel gas discharge passage 64b are the same.

The outlet buffer 66b has a triangular shape corresponding to the shapes of the oxygen-containing gas discharge passage 62b and the fuel gas supply passage 64a. The length of a first ridge line 66br1 facing the oxygen-containing gas discharge passage 62b and the length of a second ridge line 66br2 facing the fuel gas supply passage 64a are substantially the same.

The oxygen-containing gas supply passage 62a is surrounded by a long straight wall surface 62aw1 and a long curved wall surface 62aw2, and short curved end wall surfaces 62ae1, 62ae2. The straight wall surface 62aw1 is in parallel to the first ridge line 66ar1. The spacing distance between the curved wall surface 62aw2 and the straight wall surface 62aw1 is increased from the end wall surface 62ae2 to the end wall surface 62ae1.

The curved wall surface 62aw2 is curved in a direction spaced from the straight wall surface 62aw1. Therefore, in the oxygen-containing gas supply passage 62a, the width T1a of the opening on the short side is increased from the end side to the central side in the flow field width direction.

The oxygen-containing gas discharge passage 62b is surrounded by a long straight wall surface 62bw1 and a long curved wall surface 62bw2, and short curved end wall surfaces 62be1, 62be2. The straight wall surface 62bw1 is in parallel to the first ridge line 66br1. The spacing distance between the curved wall surface 62bw2 and the straight wall surface 62bw1 is increased from the end wall surface 62be2 to the end wall surface 62be1.

The curved wall surface 62bw2 is curved in a direction spaced from the straight wall surface 62bw1. Therefore, in the oxygen-containing gas discharge passage 62b, the width T2a of the opening on the short side is increased continuously from the end side to the central side in the flow field width direction.

The fuel gas supply passage 64a is surrounded by a long straight wall surface 64aw1 and a long curved wall surface 64aw2, and short curved end wall surfaces 64ae1, 64ae2. The straight wall surface 64aw1 is in parallel to the second ridge line 66br2. The spacing distance between the curved wall surface 64aw2 and the straight wall surface 64aw1 is increased from the end wall surface 64ae2 to the end wall surface 64ae1.

The curved wall surface 64aw2 is curved in a direction spaced from the straight wall surface 64aw1. Therefore, in the fuel gas supply passage 64a, the width T3a of the opening on the short side is increased continuously from the end side to the central side in the flow field width direction.

The fuel gas discharge passage 64b is surrounded by a long straight wall surface 64bw1, a long curved wall surface 64bw2, and short curved end wall surfaces 64be1, 64be2. The straight wall surface 64bw1 is in parallel to the second ridge line 66ar2. The spacing distance between the curved wall surface 64*bw*2 and the straight wall surface 64*bw*1 is increased from the end wall surface 64*be*2 to the end wall surface 64*be*1.

The curved wall surface 64*bw*2 is curved in a direction spaced from the straight wall surface 64*bw*1. Therefore, in the fuel gas discharge passage 64*b*, the width T4*a* of the opening on the short side is increased continuously from the end side to the central side in the flow field width direction.

In the second embodiment, for example, in the oxygen-containing gas supply passage 62*a*, the width T1*a* of the opening on the short side is increased from the end side to the central side in the flow field width direction of the oxygen-containing gas flow field 30. Thus, with the simple and economical structure, the same advantages as in the case of the first embodiment are obtained. For example, it is possible to uniformly and reliably supply the oxygen-containing gas over the entire surface of the oxygen-containing gas flow field 30 in the width direction.

In the second embodiment, the cross sectional area of the opening of the oxygen-containing gas supply passage 62*a* and the cross sectional area of the opening of the fuel gas discharge passage 64*b* are substantially the same, and the cross sectional area of the opening of the oxygen-containing gas discharge passage 62*b* and the cross sectional area of the opening of the fuel gas supply passage 64*a* are substantially the same. However, the present invention is not limited in this respect. For example, in the same manner as in the case of the first embodiment, the cross sectional area of the opening of the oxygen-containing gas supply passage 62*a* may be larger than the cross sectional area of the opening of the fuel gas discharge passage 64*b*, and the cross sectional area of the opening of the oxygen-containing gas discharge passage 62*b* may be larger than the cross sectional area of the opening of the fuel gas supply passage 64*a*. In this case, instead of the inlet buffer 66*a* and the outlet buffer 66*b*, the inlet buffer 32*a* and the outlet buffer 32*b* can be adopted.

FIG. 8 is a front view showing a cathode side separator 70 of a fuel cell according to third embodiment of the present invention. The constituent elements that are identical to those of the cathode side separator 14 of the fuel cell 10 according to the first embodiment are labeled with the same reference numerals, and descriptions thereof will be omitted.

In the cathode side separator 70, the cross sectional area of the opening of the oxygen-containing gas supply passage 18*a* is smaller than the cross sectional area of the opening of the oxygen-containing gas discharge passage 18*b*. In the oxygen-containing gas supply passage 18*a*, the width T11 of the opening on the short side is increased from the end side to the central side in the flow field width direction. Specifically, the length W1 of the end wall surface 18*ae*1 is larger than the length W2 of the end wall surface 18*ae*2 (W1>W2).

In the oxygen-containing gas discharge passage 18*b*, the width T12 of the opening on the short side is decreased from the end side to the central side in the flow field width direction. Specifically, the length W3 of the end wall surface 18*be*1 is smaller than the length W4 of the end wall surface 18*be*2 (W3<W4).

In the third embodiment, with the simple and economical structure, the same advantages as in the cases of the first and second embodiments are obtained. For example, it is possible to uniformly and reliably supply the oxygen-containing gas over the entire surface of the oxygen-containing gas flow field 30 in the width direction.

FIG. 9 is a front view showing a cathode side separator 80 of a fuel cell according to a fourth embodiment of the present invention. The constituents elements that are identical to those of the cathode side separator 60 of the fuel cell according to the second embodiment are labeled with the same reference numerals, and descriptions thereof will be omitted.

In the cathode side separator 80, the cross sectional area of the opening of the oxygen-containing gas supply passage 62*a* is smaller than the cross sectional area of the opening of the oxygen-containing gas discharge passage 62*b*. In the oxygen-containing gas supply passage 62*a*, the width T11*a* of the opening on the short side is increased continuously from the end side to the central side in the flow field width direction. The end wall surface 62*ae*2 of the oxygen-containing gas supply passage 62*a* includes an R-shaped portion.

In the oxygen-containing gas discharge passage 62*b*, the width T2*a* of the opening on the short side is increased continuously from the end side to the central side in the flow field width direction, and the end wall surface 62*be*2 includes an R-shaped portion.

In the fourth embodiment, with the simple and economical structure, the same advantages as in the case of the first to third embodiments are obtained. For example, it is possible to uniformly and reliably supply the oxygen-containing gas over the entire surface of the oxygen-containing gas flow field 30 in the width direction.

While the invention has been particularly shown and described with reference to the preferred embodiment, it will be understood that variations and modifications can be effected thereto by those skilled in the art without departing from the scope of the invention as defined by the appended claims.

What is claimed is:

1. A fuel cell formed by stacking a membrane assembly and separators, the membrane electrode assembly including electrodes and an electrolyte membrane interposed between the electrodes, one of the separators having a generally rectangular shape with two opposed long sides and two opposed short sides, and comprising:
   a reactant gas flow field for allowing a fuel gas or an oxygen-containing gas as one of reactant gases to flow along a separator surface in one direction, and
   a reactant gas passage defined by an opening extending through the separator proximate one of the short sides thereof, and connected to the reactant gas flow field for allowing the one of the reactant gases to flow in the stacking direction of the separators;
   wherein:
   the opening of the reactant gas passage has a tapered shape extending in a flow field width direction intersecting with a flow direction in the reactant gas flow field; and in the reactant gas passage, a width of the opening on the short side of the separator is greater at a first edge of the opening near a central longitudinal axis of the separator than the width of the opening at a second edge of the opening spaced away from said central longitudinal axis in the flow field width direction,
   the one of the separators has triangular buffers provided at an inlet and an outlet of the reactant gas flow field, respectively;
   the width of the opening decrease continuously from a maximum width proximate the first edge to a minimum width at the second edge alongside of a corresponding one of the triangular buffers;
   the width of the opening of the reactant gas passage is greatest proximate a wide portion of one of the buffers;
   one side of the opening of the reactant gas passage is in parallel to one side of the triangular buffers; and a length of the opening of the reactant gas passage is smaller than a width of the reactant gas flow field in the flow field width direction.

2. The fuel cell according to claim 1, wherein the reactant gas passage is a reactant gas supply passage for supplying the reactant gas to at least the reactant gas flow field; and
a cross sectional area of the opening of a reactant gas discharge passage for discharging the reactant gas from the reactant gas flow field is larger than a cross sectional area of the opening of the reactant gas supply passage.

3. The fuel cell according to claim 1, wherein the opening of the reactant gas passage has a tapered rectangular shape.

4. A fuel cell formed by stacking a membrane electrode assembly and separators, the membrane electrode assembly including electrodes and an electrolyte membrane interposed between the electrodes, one of the separators having a generally rectangular shape with two opposed long sides and two opposed short sides, and comprising:
a reactant gas flow field for allowing a fuel gas or an oxygen-containing gas as one of reactant gases to flow along a separator surface in one direction,
and a reactant gas passage defined by an opening extending through the separator proximate one of the short sides thereof, and connected to the reactant gas flow field for allowing the one of the reactant gases to flow in a stacking direction of the separators;
wherein:
the opening of the reactant gas passage has a tapered rectangular shape extending in a flow field width direction intersecting with a flow direction in the reactant gas flow field; and in the reactant gas passage, a width of the opening is greater at a first edge of the opening near a central longitudinal axis of the separator than the width of the opening at a second edge of the opening spaced away from said central longitudinal axis in the flow field width direction,
said one of the separators has asymmetrical triangular buffers provided at an inlet and an outlet of the reactant gas flow field, respectively;
the width of the opening of the reactant gas passage is greatest proximate a wide portion of one of the buffers;
the width of the opening decreases continuously from a maximum width proximate the first edge to a minimum width at the second edge alongside of a corresponding one of the triangular buffers;
a length of the opening of the reactant gas passage is smaller than a width of the reactant gas flow field in the flow field width direction; and
one side of the opening of the reactant gas passage is in parallel to one side of the triangular buffers.

5. The fuel cell according to claim 4, wherein the reactant gas passage is a reactant gas supply passage for supplying the reactant gas to at least the reactant gas flow field; and
a cross sectional area of the opening of a reactant gas discharge passage for discharging the reactant gas from the reactant gas flow field is larger than a cross sectional area of the opening of the reactant gas supply passage.

* * * * *